(12) United States Patent
Darnell

(10) Patent No.: US 8,732,934 B2
(45) Date of Patent: May 27, 2014

(54) CONNECTOR

(75) Inventor: David Trevor Darnell, Great Yarmouth (GB)

(73) Assignee: Weatherford UK Limited, Norfolk (GB)

( * ) Notice: Subject to any disclaimer, the term of this patent is extended or adjusted under 35 U.S.C. 154(b) by 392 days.

(21) Appl. No.: 13/053,501

(22) Filed: Mar. 22, 2011

(65) Prior Publication Data
US 2011/0225789 A1 Sep. 22, 2011

(30) Foreign Application Priority Data
Mar. 22, 2010 (GB) .................................. 1004756.1

(51) Int. Cl.
*B23P 11/00* (2006.01)
*F16L 37/00* (2006.01)

(52) U.S. Cl.
USPC ....................................... 29/525.01; 285/313

(58) Field of Classification Search
USPC ...... 29/428, 453, 464, 466, 468, 48.5 R, 705, 29/718, 234, 237, 240, 272, 525.01; 285/313
See application file for complete search history.

(56) References Cited

U.S. PATENT DOCUMENTS
3,698,744 A 10/1972 Bevington

FOREIGN PATENT DOCUMENTS

| DE | 20313792 U1 | 11/2003 |
|----|-------------|---------|
| GB | 2165608 A | 4/1986 |
| GB | 2411706 A | 7/2005 |
| WO | 2009101279 A2 | 8/2009 |

OTHER PUBLICATIONS

International Search Report dated Jun. 23, 2010 received for corresponding UK Patent Application No. GB1004756.1.
Guesnon, J. et al., A Riser for Ultra-Deepwater Drilling-Brief Article—Statistical Data Included, World Oil, Apr. 2000, pp. 1-2, Copyright 2000 Gulf Publishing Co., Copyright 2000 Gale Group.
AkerSolutions™ part of Aker, CLIP Riser™ for marine drilling operations, Jun. 2009, © 2009 Aker Solutions, www.akersolutions.com.
AkerSolutions™, Drilling risers, p. 1, Dec. 16, 2009, www.akersolutions.com/Internet/IndustriesandServices/Subsean/products/ . . . .
Elmar™ NOV, Pressure Control Equipment, pp. 1-51, © copyright National Oilwell Varco, Inc. 2006.
De Bonnafos, Oliver et al., Riser system is designed for 3,000 m water depths, Drilling Contractor, Sep./Oct. 2000, pp. 28-30.
Elmar™ NOV, Typical Slickline Pressure Control Equipment String, copyright National Oilwell Varco, Inc. 2006.
Guesnon J. et al., Ultra Deep Water Drilling Riser Design and Relative Technology, Oil & Gas Science and Technology, Rev. IFP, vol. 57 (2002), No. 1, pp. 39-57, copyright © 2002, Éditions Technip.

*Primary Examiner* — John C Hong
(74) *Attorney, Agent, or Firm* — Wong, Cabello, Lutsch, Rutherford & Brucculeri LLP

(57) ABSTRACT

A connector comprises a male component, a female component configured to receive an end portion of the male component, and a rotatable collet mounted on the male component. The collet and the female component comprise respective complementary inter-engaging lugs configured to secure the male and female components together in an engaged position. A latch is provided on the collet to lock the male and female components together.

27 Claims, 5 Drawing Sheets

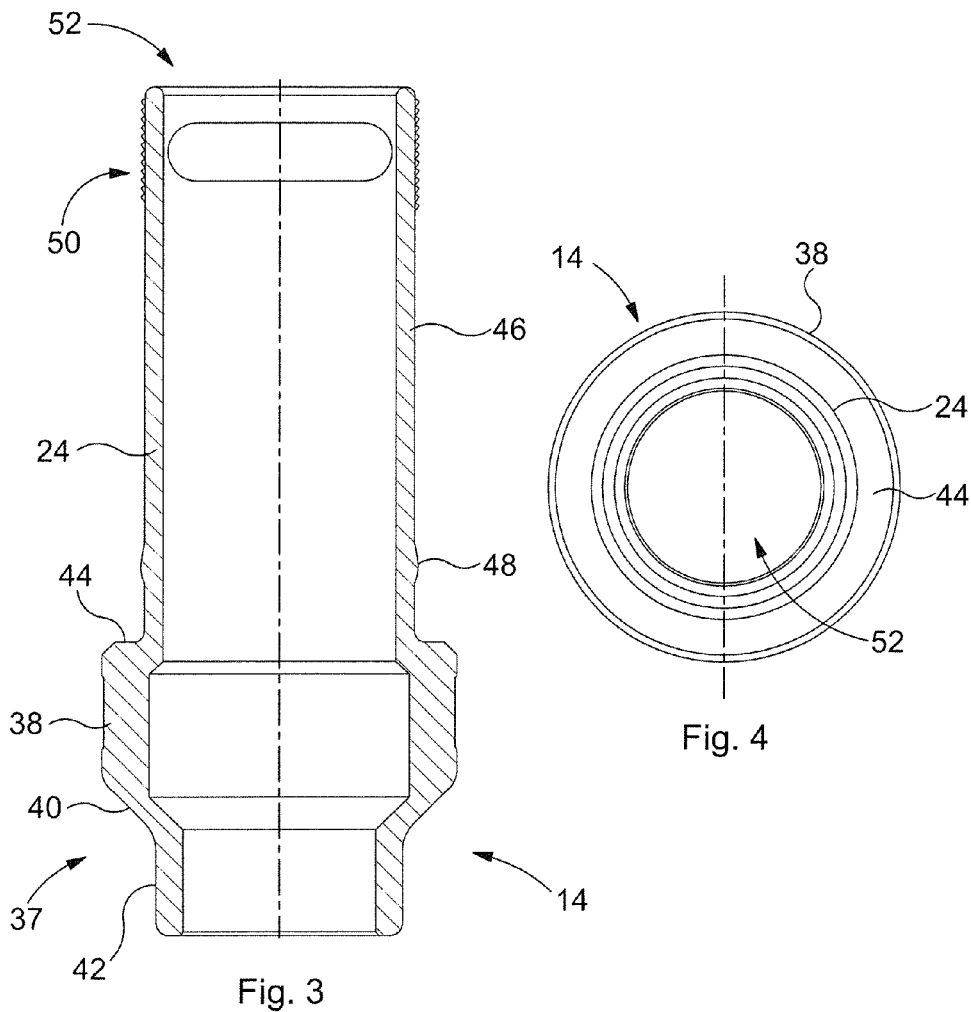
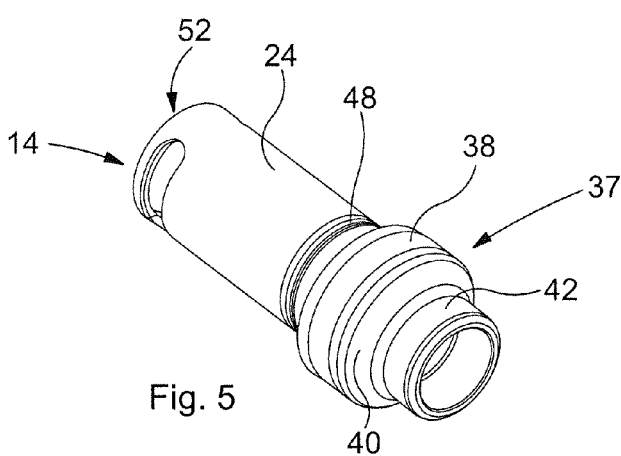

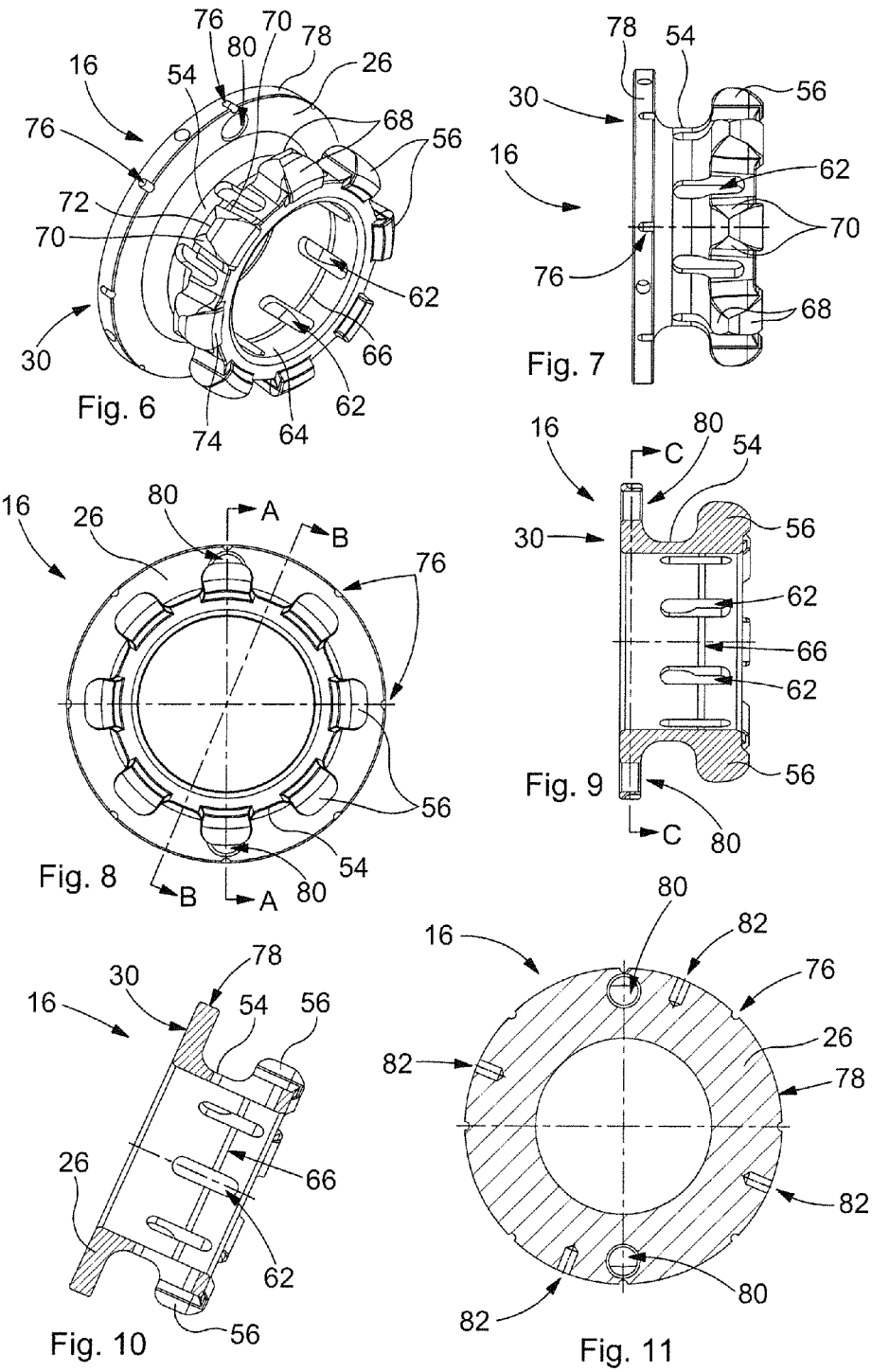

CONNECTOR

CROSS REFERENCE TO RELATED APPLICATIONS

The present application claims priority to United Kingdom Patent Application No. GB1004756.1 filed on 22 Mar. 2010, the contents of which are incorporated herein by reference.

FIELD OF THE INVENTION

This invention relates to a connector. Particularly, but not exclusively, the invention relates to a lubricator or an assembly of temporary surface pressure control equipment (for slickline, wireline and braided cable operations) incorporating the connector and a method of operating the connector.

BACKGROUND TO THE INVENTION

The problem of physically connecting one part, such as a pipe, to another has historically been resolved (across all engineering disciplines) by means of a screw-threaded engagement. This requires one part to include a helical projection (i.e. thread) and the other to include a complementary recess such that relative rotation or screwing of one part with respect to the other permits engagement therebetween. While such a connecting mechanism is adequate in many circumstances, the act of screwing one part onto the other can be time-consuming and can require significant physical exertion for an operator, particularly when large and/or heavy parts are involved.

The considerations described above are particularly apparent in the oil and gas exploration and extraction industry where many large and heavy parts are often required to be connected. For example, a drill pipe string of several miles long may be manually constructed on a rig by screwing many individual tubular metal sections, in the form of pipe sections or stands, together. In certain operations, a relatively large diameter riser will be provided between the wellhead and the drill rig. The riser is also made up of several individual tubular metal sections which are commonly made up by screwing together on the rig. More recently, an improved coupling has been employed, as described in WO2009/101279, in which portions of a riser are provided with a male and a female connector element, the male connector element having a locking ring mounted thereon which has a series of lugs configured for engagement with a complementary series of lugs on the female connector element. While this arrangement takes less time and is less strenuous to operate than a traditional screw-threaded connection, the configuration requires manual connection of a further element in the form of an auxiliary tube attached to the side of the riser, so as to provide the required level of strength, security and functionality.

In other operations in this industry, tools, valves, packers, sensors and other devices are lowered into and retrieved from well bores using flexible relatively small diameter supports constituted, for example, by coil tubing, slickline or wireline. The support passes through a lubricator stuffing box and grease head comprising a tubular body mounted above an opening providing access into the well bore. The lubricator may be supported in a derrick or from a crane jib. The lubricator provides a lock via which tools may be inserted into and retrieved from a well which is under pressure. To insert a tool, the well is closed below the lubricator and pressure within the lubricator is bled off. The lubricator is then opened to receive the tool, which is coupled to the end of the support. The lubricator is then closed and the well opened below the lubricator, allowing the tool to be run into the well.

Typically, a lubricator will be assembled along with other items of temporary surface pressure control equipment into a so-called rig-up. The precise structure of the rig-up will vary depending on the nature of the work being performed. At present, each piece of equipment forming the rig-up is fitted together manually using standard screw-threaded Bowen and Otis type quick union couplings. These couplings generally comprise a male component, a female component and a heavy collar which is rotatably mounted on the male component and includes a screw-thread for engagement with a complementary thread provided on the female component. An O-ring seal is provided between the male and female components to contain the well pressure and/or fluid. However, such couplings are difficult and time-consuming for an operator to assemble and disassemble. For example, a conventional Otis lubricator has an 11.5 inch (29.2 cm) diameter thread which requires approximately 16 turns of the collar to fully engage the male and female components. It is also common for debris and well fluid to make thread engagement difficult. In addition, working with conventional couplings involves heavy manual handling.

Furthermore, the rig-up is usually partially assembled directly onto the well head and partially assembled in the horizontal position on a rig deck, this latter section then being raised into a vertical position before being connected to the well head assembly. During operations with the rig-up in a vertical position, the connection above the wireline valve has to be repeatedly broken to change tools. This is done by an operator working at height—often suspended in a harness. It will be appreciated that the traditional couplings described above will be even more difficult and time-consuming to assemble and disassemble when working in such conditions.

It is therefore an aim of the present invention to provide a connector that addresses at least some of the afore-mentioned problems.

SUMMARY OF THE INVENTION

According to a first aspect of the present invention there is provided a connector comprising: a male component; a female component configured to receive at least a portion of said male component; and a rotatable collet mounted on one of the male and female components; the collet and the other of the male or female components comprising respective complementary inter-engaging portions configured to secure the male and female components together in an engaged position; and a latch operable to lock the male and female components together in a locked position.

Embodiments of the invention effectively provide a quick and easy to operate connector, resulting in reduced downtime for assembly and disassembly and a lower requirement for manpower. The provision of a rotatable collet means that the generally larger and heavier collars of convention couplings are not required to be rotated. In addition, the provision of a locking latch means that no tools are required to lock the connector since the latch can be arranged to automatically lock the male and female components together, when the collet has been engaged. Essentially, the operator may only be required to rotate the collet sufficiently for the latch to engage. Thus, operation of the connector is less strenuous when compared to the traditional couplings described above, thereby reducing any resulting health and safety risks. Moreover, the connector is provided with a dual locking mechanism, provided by both the inter-engaging portions and the latch, and as such ensures a secure connection which has a low risk of becoming unintentionally disconnected.

The connector may be configured for use with a lubricator or any piece of temporary surface pressure control equipment.

The engaged position and the locked position may be arranged to coincide.

The complementary inter-engaging portions may be arranged to secure the male and female components together against relative longitudinal movement. The latch may be configured to prevent relative rotation of the collet with respect to the male and/or female component, when in the engaged position.

The complementary inter-engaging portions may comprise a first set of protrusions provided on the collet and a second set of protrusions provided on said one of the male and female components. The first and/or second set of protrusions may comprise a plurality of circumferentially spaced apart projections. The first and second set of protrusions may be arranged to permit relative axial movement between the collet and said one of the male or female components in a first orientation and to prevent relative axial movement between the collet and said one of the male or female components in a second orientation (i.e. after relative rotation of the collet).

The complementary inter-engaging portions may be configured to secure the male and female components together in the engaged position when the collet has been rotated by an angle of approximately 60° or less, 50° or less, 40° or less, 35° or less, 30° or less, 25° or less, or 20° or less, relative to the male or female component.

The complementary inter-engaging portions may be in the form of a bayonet connection.

The connector may further comprise an annular seal. The annular seal may be of the type known as an O-ring. The annular seal may be provided on the male component, the female component or the collet.

In a particular embodiment, two or more annular seals may be provided. A path may be provided from the exterior of the connector to a region between the seals for testing the effectiveness of the seals.

The collet may be configured to rotate in one or both of a clockwise and an anticlockwise direction in order to engage the complementary inter-engaging portions.

A stop may be provided to indicate to an operator that the collet has been rotated sufficiently to engage and/or disengage the complementary inter-engaging portions.

The collet and/or said one of the male or female components may include at least one indicator arranged to aid the operator with orientation of the collet so as to permit insertion or retraction of the male component with respect to the female component. The indicator may comprise one or more notches provided on the collet and said one of the male or female components may be arranged such that alignment of the one or more notches on the collet with the one or more notches on said one of the male or female components permit insertion or retraction of the male component with respect to the female component.

In a particular embodiment, the collet is provided on the male component.

The collet may comprise a substantially tubular portion supporting the respective part of the complementary inter-engaging portions and a radial flange extending from the end of the tubular portion furthest from the female component when in use.

The collet may be formed from a less dense material than that from which the male and/or female component is formed.

The collet may be provided with one or more handles to facilitate the rotation thereof. Alternatively, or in addition, the collet may be provided with one or more recesses into which a tool may be inserted to facilitate rotation of the collet.

The latch may be housed in one of the collet handles. Where more than one handle is provided, a latch may be housed in some or each of the handles.

The latch may be arranged to act longitudinally or axially with respect to the male and/or female component. Alternatively, the latch may be arranged to act radially or tangentially with respect to the male and/or female component.

The latch may be configured for manual operation or it may be triggered automatically. For example, the latch may be arranged to operate as a result of gravity. Alternatively, the latch may comprise a spring-biased locking mechanism.

The spring-biased locking mechanism may be arranged to be retractable against the bias of the spring to allow engagement of the complementary inter-engaging portions and to extendable in accordance with the bias of the spring to lock the male and female components together after the collet has been rotated to the engaged position.

The latch may be supported by the collet and arranged to extend into a recess provided in the female component when the collet has been rotated to the engaged position.

The connector may further comprise a retaining mechanism configured to lock off the latch so that it remains in a set position. The retaining mechanism may be configured to retain the latch in an extended and/or retracted position.

The latch may be arranged to provide a visual indication when the connector is in said locked position.

The male portion may comprise a radially enlarged portion which is configured to abut a shoulder of a correspondingly enlarged portion in the bore of the female component.

According to a second aspect of the present invention there is provided a lubricator comprising: an upper section; a lower section; and a connector therebetween; the connector comprising a male component; a female component configured to receive at least a portion of said male component; and a rotatable collet mounted on one of the male and female components; the collet and the other of the male and female components comprising respective complementary inter-engaging lugs configured to secure the male and female components together in an engaged position.

According to a third aspect of the present invention there is provided an assembly of surface pressure control equipment comprising: at least one upper piece of equipment; at least one lower piece of equipment; and at least one connector therebetween, the connector comprising: a male component; a female component configured to receive at least a portion of said male component; and a rotatable collet mounted on one of the male and female component, the collet and the other of the male and female components comprising respective complementary inter-engaging lugs configured to secure the male and female components together in an engaged position.

A latch may be provided to lock the male and female components together in a locked position.

It will be noted that the optional features described above in relation to the first aspect of the present invention will apply equally to the second and third aspects of the present invention.

According to a fourth aspect of the present invention there is provided a method of operating a connector according to the first aspect of the present invention comprising the steps of: inserting the male component into the female component; and rotating the collet with respect to the male and/or female component to engage the complementary inter-engaging portions and permit the latch to lock the male and female components together.

The above method may be employed in a process for inserting an item into a lubricator. In this case, the method may further comprise the step of inserting an item on a wireline or other support into a lubricator prior to operating the connector as described above. The method may further comprise the step of disconnecting the connector by disengaging the latch, rotating the collet with respect to the male and/or female component to disengage the complementary inter-engaging portions and retracting the male component from the female component. The item on the wireline may then be removed from the lubricator and the process repeated to insert another item into the lubricator.

It will be understood that it is common practice to change tools often when using a wireline lubricator and so the process described above may be undertaken many times during a single operation. Accordingly, it is advantageous to employ a connector according to the first aspect of the invention because it is quick and easy to use as well as being less physically demanding than the connectors previously employed.

BRIEF DESCRIPTION OF THE DRAWINGS

Certain embodiments of the invention will now be described with reference to the accompanying drawings, in which:

FIG. 3 shows a cross-sectional of the male component shown in the assembly of FIG. 1;

FIG. 4 shows a top end view of the male component of FIG. 3;

FIG. 5 shows a perspective view of the male component of FIG. 3;

FIG. 6 shows a perspective view of the collet shown in the assembly of FIG. 1;

FIG. 7 shows a side view of the collet of FIG. 6;

FIG. 8 shows an end view of the collet of FIG. 6;

FIG. 9 shows a side cross-sectional view of the collet of FIG. 8, taken through lines AA;

FIG. 10 shows a side cross-sectional view of the collet of FIG. 8, taken through lines BB;

FIG. 11 shows an end cross-sectional view of the collet of FIG. 11, taken through lines CC;

DETAILED DESCRIPTION OF CERTAIN EMBODIMENTS

Figure 1:
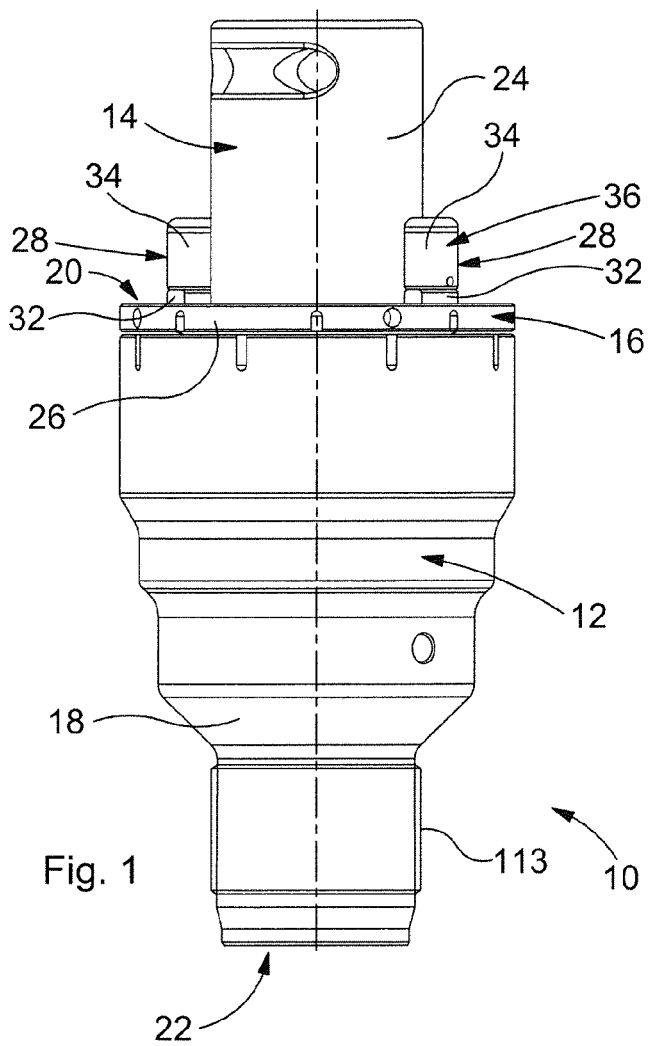
FIG. 1 shows a side view of an assembled connector according to an embodiment of the present invention.

With reference to FIG. 1, there is illustrated an assembled connector 10 according to a first embodiment of the present invention. The connector 10 comprises a female component 12, a male component 14 and a collet 16. The female component 12 has a hollow generally tubular body 18 which is wider at an upper end 20 than at a lower end 22. The male component 14 also comprises a generally tubular body 24, the nose (not shown) of which is inserted into the upper end 20 and received within the female component 12, as illustrated. The collet 16 is located between the male component 14 and the female component 12 such that only its outer flange 26 is visible in FIG. 1. The male component 14, collet 16 and female component 12 will be described in more detail below in relation to subsequent figures.

Figure 2:
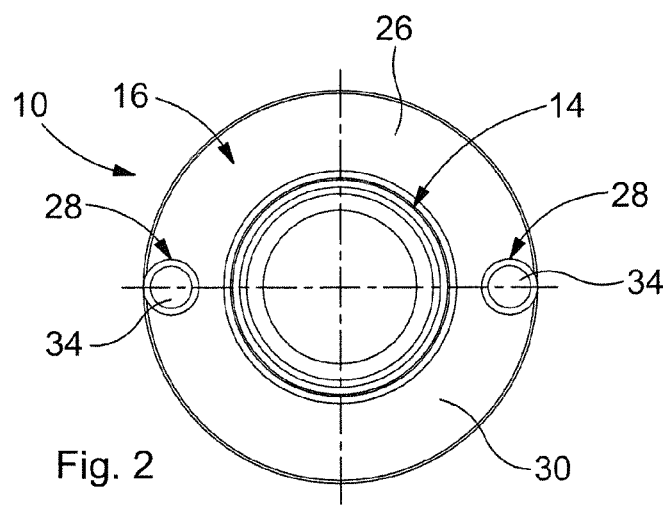
FIG. 2 shows a top end view of the assembly of FIG. 1.

Also shown in FIGS. 1 and 2 are two diametrically opposed handles 28 extending in a longitudinal direction from the exposed transverse surface 30 of the collet 16. The handles 28 each comprise a housing 32 for a latch in the form of a spring-biased locking mechanism, as will be described below in relation to FIG. 15, and a cap 34. Each cap 34 includes an indicator 36 in the form of a circular spot which serves to indicate the relative rotational location of the cap 34 with respect to the housing 32.

FIGS. 3, 4 and 5 show the male component 14 in isolation. Thus, it can be seen that the nose 37 of the tubular body 24, which is received within the female component 12 as illustrated in FIG. 1, has a radially enlarged portion 38. The radially enlarged portion 38 has an annular chamfered surface 40 extending to a smaller cylindrical section 42 at the tip of the nose 37. The opposite end of the radially enlarged portion 38 has an annular radial surface 44 extending to a remaining cylindrical portion 46 of the body 24. A small annular ridge 48 is provided on the cylindrical portion 46, a short distance away from the radial surface 44. An external thread portion 50 on the upper end 52 of the male component 14, opposite to the nose 37, and similar to that shown on the female component 12, is provided for attachment to an upper portion of equipment such as the tube of a lubricator.

FIGS. 6 through 11 show detailed views of the collet 16 shown in FIGS. 1 and 2. The collet 16 comprises a substantially tubular portion 54 configured to extend from the flange 26 into the female component 12. The tubular portion 54 supports a set of eight circumferentially spaced apart projections 56 on its outer surface which form a first complementary inter-engaging portion arranged to act between the collet 16 and the female component 12. In this embodiment, the projections 56 are generally pyramidal in shape, having two slightly curved leading and trailing surfaces 68 and two slightly curved side surfaces 70 extending to a transverse peak 72 from a generally cuboidal base 74.

Interspersed between each projection 56 is a longitudinal slot 62 through the tubular portion 54 to minimise the weight of the collet 16. In addition, the inner surface 64 of the tubular portion 54 is provided with an annular ridge 66 for mating with the ridge 48 on the male component 14, when in use.

The flange 26 of the collet 16 is provided with a set of eight circumferentially spaced apart notches 76 on its outer radial surface 78. As shown in FIG. 8, the notches 76 are aligned with the centres of the projections 56 and thereby serve to indicate the position of the projections 56 when the tubular portion 54 is received in the female component 12. The flange 26 is also provided two longitudinal holes 80 through its exposed transverse surface 30, to accommodate the housings 32 for the spring-biased locking mechanism. It will be noted that the holes 80 are aligned with two of the notches 76. Furthermore, as shown in FIG. 11, the flange 26 includes four equally spaced apart blind holes 82 extending radially inwardly from the outer radial surface 78. It will be noted that the blind holes 82 are circumferentially offset from the holes 80 and are provided so that an operator can insert a tool into one or more of the holes 82 in order to use the tool to facilitate rotation of the collet 16.

Figures 12, 13:
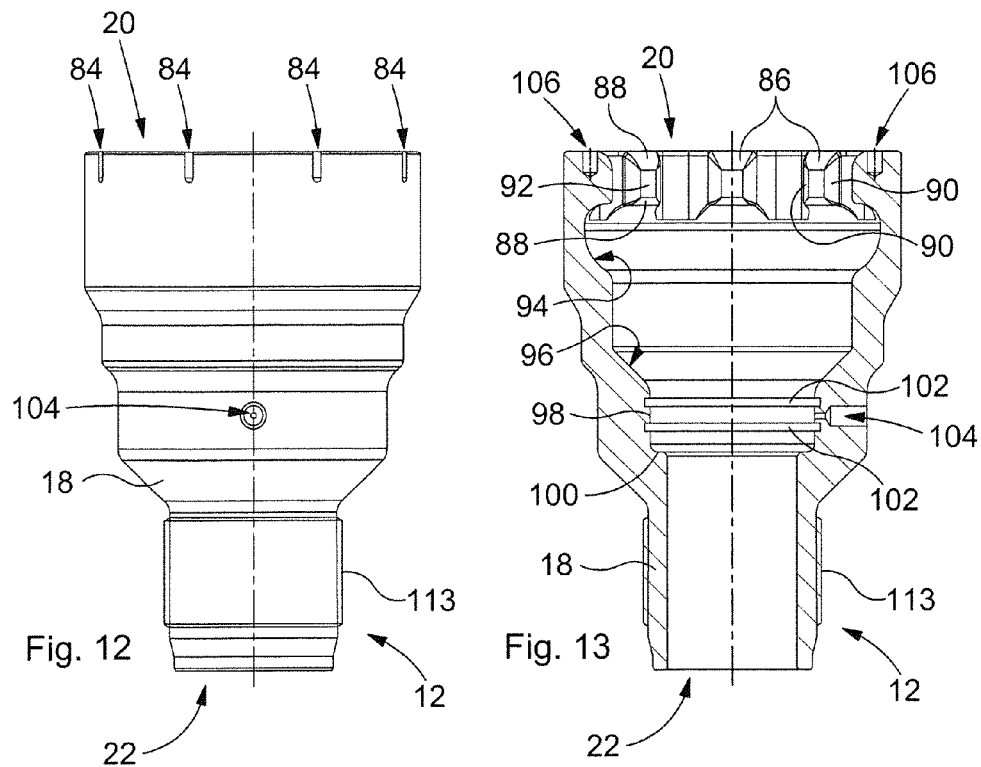
FIG. 12 shows a side view of the female component shown in the assembly of FIG. 1.
FIG. 13 shows a side cross-sectional view of the female component of FIG. 12.
Figure 14:
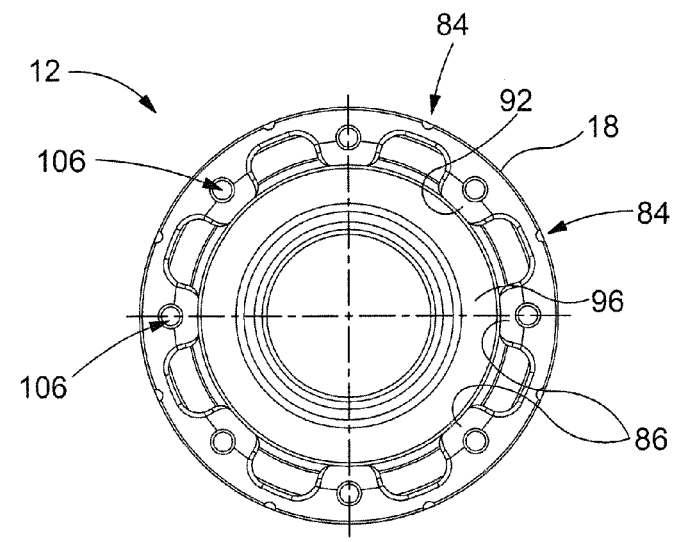
FIG. 14 shows a top end view of the female component of FIG. 12.

The female component 12 is shown in isolation in FIGS. 12, 13 and 14. The outer surface of the body 18 is provided with a series of eight circumferentially spaced apart notches 84 adjacent the upper end 20. These notches 84 are arranged to indicate the correct orientation of the collet 16 for insertion into the female component 12, when the notches 84 are aligned with the notches 76.

As shown in FIGS. 13 and 14, the interior surface of the body 18, adjacent the upper end 20, is provided with a second set of eight circumferentially spaced apart projections 86 which form a second complementary inter-engaging portion arranged to act between the collet 16 and the female component 12. The projections 86 are generally in the shape of truncated pyramids, having two inclined leading and trailing surfaces 88 and two inclined side surfaces 90 extending to a flat rectangular tip 92. As shown in FIG. 14, the notches 84 are aligned with the centre of the gaps between the projections 86. Below the projections 86 is an inner annular groove 94 provided to accommodate the projections 56 on the collet 16 when in use. Spaced a short distance from the groove 94 is an inclined shoulder 96 sloped inwardly away from the upper end 20, which is configured to abut the chamfered surface 40 of the male component 14 when in use. From the inner end of the inclined shoulder 96, the inner surface of the body 18 extends with a generally cylindrical portion 98 to a radial stop surface 100 arranged to abut the tip of the nose 37 of the male component 14 when in use. In the embodiment shown, the cylindrical portion 98 is provided with two annular grooves 102 for housing respective O-ring seals (not shown). A port 104 is provided on the outer surface of the body 18 extending radially inwardly at a location between the two annular grooves 102. The port 104 is provided for testing the sealing properties of the O-ring seals by allowing the application of an elevated fluid pressure between the seals and the monitoring of this pressure to check whether the pressure is being maintained or whether fluid is leaking past one or both seals.

A series of eight longitudinal blind holes 106 is provided on the transverse surface of the female component 12. As shown in FIG. 14, these holes 106 are aligned with the centres of the projections 86.

Figures 15, 16:
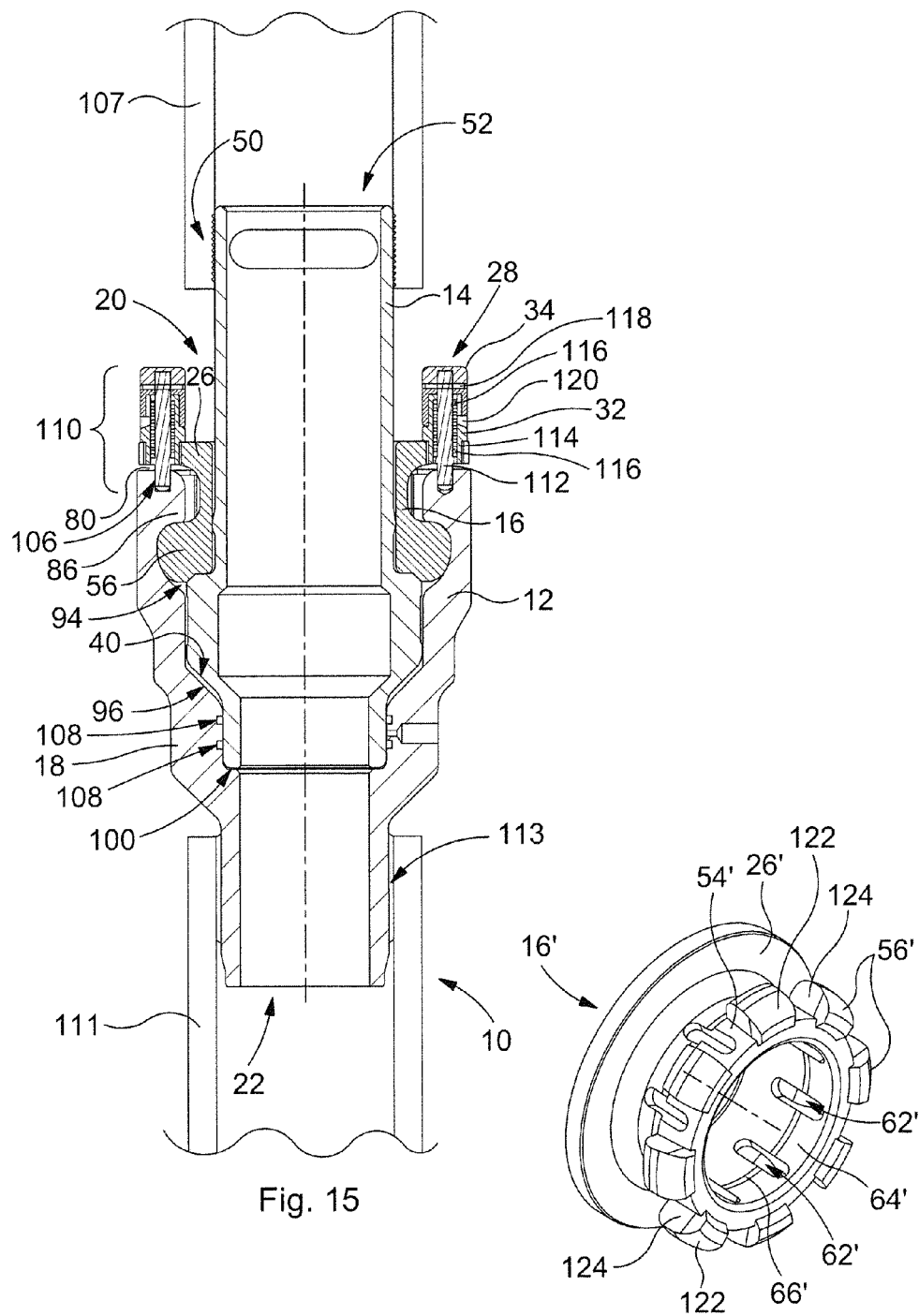
FIG. 15 shows a cross-sectional view through the assembly of FIG. 1.
FIG. 16 shows a perspective view of a further collet which could be used with the male component of FIGS. 3 to 5 in a second embodiment of the present invention.

FIG. 15 shows a cross-sectional view through the assembled connector 10 of FIGS. 1 and 2, when the connector 10 is provided in an assembly of temporary surface pressure control equipment. More specifically, the male component 14 of the connector 10 is suspended from and sealingly coupled to a tubular portion 107 of a lubricator by provision of an external screw thread 50 provided on the male component 14. The female component 12 is mounted on and sealingly coupled to a lower tubular portion 111 of the lubricator by provision of an external screw thread 113 provided on the female component 14 for engagement in a complementary threaded recess in the interior of the lower tubular portion 111.

It will be understood that, in order to arrive at the configuration shown the following steps must be undertaken. Firstly, the collet 16 is provided on the male component 14 such that the free end of the tubular portion 54 abuts the radial surface 44 and the ridge 48 co-operates with the ridge 66 to retain the collet 16 on the male component 14. The nose 37 of the male component 14 is then brought close to the upper end 20 of the female component 12 and the collet 16 is rotated about the male component 14 to align the notches 76 with the notches 84 on the female component. The nose 37 may then be inserted into the female component 12 since the projections 56 on the collet 16 will be aligned with the gaps between the projections 86 on the female component 12. Eventually, annular chamfered surface 40 of the male component 14 will abut the inclined shoulder 96 on the female component to prevent further insertion of the male component 14 into the female component 12. In this position it will be noted that the projections 56 of the collet 16 will be located in the groove 94 of the female component 12, below the projections 86. As such, rotation of the collet 16 with respect to the female component 12 will be permitted. When the collet 16 has been rotated to align the projections 56 below the projections 86, it will not be possible to extract the male component 14 from the female component 12 and so the components will be secured together in the longitudinal direction.

It will be understood, that in this embodiment, O-ring seals 108 will be provided in the grooves 102 prior to insertion of the male component 14 into the female component 12.

As illustrated in FIG. 15, when the collet 16 has been rotated so as to align the two holes 80 in the flange 26 with any two of the holes 106 in the female component 12, the spring-biased locking mechanism 110 will be enabled to prevent any further rotation of the collet 16 with respect to the female component 12 thereby serving to lock the components together. As explained above in relation to FIGS. 1 and 2, the spring-biased locking mechanism 110 is provided in each handle 28. Each housing 32 of the spring-biased locking mechanism 110 is secured in a respective hole 80 by a screw thread. A locking rod 112 is provided in each housing 32 and extends longitudinally therethrough, as shown in FIG. 15. A compression spring 114 surrounds the locking rod 112 and is retained within the housing 32 by upper and lower lips 116. The cap 34 is secured to the free end of the locking rod 112 by a transverse roll pin 118. A second transverse roll pin 120 is provided to maintain the locking rod 112 in the housing 32. In addition, the roll pin 120 forms a part of a bayonet-like structure configured such that on extraction and rotation of the locking rod 112 the roll pin 120 can rest on a ledge (not shown) within the housing 32 to retain the locking rod 112 in its extracted or retracted position.

It will be understood that prior to insertion of the male component 14 into the female component 12, the locking rods 112 will project out of the underside surface of the flange 26 due to the tension in the spring 114. When the collet 16 is inserted into the female component 12, the locking rods 112 will contact the top surface of the female component 12 before the flange 26. As the holes 80 and therefore the locking rods 112 are aligned with the notches 76 they will necessarily not be aligned with the holes 106 as the collet is being inserted into the female component 12. In order to engage the flange 26 with the top surface of the female component 12 (and thereby align the projections 56 with the groove 96) a longitudinal force will be required to be exerted to overcome the bias in the springs 114 and cause the locking rods 112 to retract into the housings 32. The locking rods 112 in turn will extend out of the opposite end of the housings 32 and so the caps 34 will be raised from the housings 32 to indicate that the locking rods are extracted. Once the flange 26 abuts the top surface of the female component 12, the collet 16 will be permitted to rotate. When the collet 16 has been rotated sufficiently to align the locking rods 112 with the holes 106, the springs 114 will serve to automatically extend the locking rods 112 into the holes 106 to thereby prevent further rotation of the collet 16. As the locking rods 112 extend into the holes 106 the caps 34 will return to their rest positions on the housings 34 to indicate that the locking rods 112 are suitably engaged, as shown in FIG. 15.

In order to disassemble the connector 10, each cap 34 can be pulled outwardly from the flange 26 to extract the locking rod 112 from the hole 106 by overcoming the tension in the spring 114. When the locking rod 112 is extracted from the hole 106, the cap 34 can be rotated to lock the locking rod 112 in its extracted position by location of the roll pin 120 on a ledge (not shown), as described above. This will enable the operator to release the cap 34 so that they can then extract the other locking rod 112 and lock it in its extracted position. This will consequently allow the operator to freely rotate the collet 16 to align the notches 76 with the notches 84 to thereby permit extraction of the male component 14 from the female component 12 to release the coupling. It will be understood that the collet 16 will be withdrawn along with the male component 14, significantly reducing heavy manual handling work and improving operational safety.

FIG. 16 shows a further collet 16' which is similar to that shown in FIGS. 6 through 11 and so similar features will be indicated by the same reference numerals, suffixed by a dash. The further collect 16' is suitable for use with the male component 14 and female component 12 shown in FIG. 1. As for the collet 16 described above, the further collet 16' comprises a substantially tubular portion 54' configured to extend from a flange 26' into the female component 12 when in use. However, in this case, the tubular portion 54' supports a set of eight circumferentially spaced apart projections 56' of a slightly different configuration to those previously described. More specifically, the projections 56' are generally cuboidal in shape but having a curved surface 122 extending from the region closest to the flange 26' and running in a longitudinal direction toward the free end of the tubular portion 54'. The side surfaces 124 of each projection 56' are generally flat. As before, interspersed between each projection 56' is a longitudinal slot 62' through the tubular portion 54' to ensure that the weight of the collet 16' is reduced. Also as before, the inner surface 64' of the tubular portion 54' is provided with an annular ridge 66' for mating with the ridge 48 on the male component 14 to aid retention thereon. Although not illustrated in FIG. 16, the flange 26' may include some or all of the features described above in relation to collet 16.

It will be appreciated by persons skilled in the art that various modifications may be made to the above embodiments without departing from the scope of the present invention.

The invention claimed is:

1. A connector comprising:
   a male component;
   a female component configured to receive at least a portion of said male component;
   a rotatable collet mounted on one of the male and female components, the collet and the other of the male and female components comprising respective complementary inter-engaging portions configured to secure the male and female components together in an engaged position; and
   a latch operable to lock the male and female components together in a locked position, wherein the latch is arranged to automatically lock the male and female components together when the collet is engaged.

2. The connector according to claim 1 herein the engaged position and the locked position coincide.

3. The connector according to claim 1 wherein the complementary inter-engaging portions are arranged to secure the male and female components together against relative longitudinal movement.

4. The connector according to claim 1 wherein the latch is configured to prevent relative rotation of the collet with respect to at least one of the male and female components, when in the engaged position.

5. The connector according to claim 1 wherein the complementary inter-engaging portions comprise a first set of protrusions provided on the collet and a second set of protrusions provided on said one of the male and female components.

6. The connector according to claim 5 wherein the first and second set of protrusions comprise a plurality of circumferentially spaced apart projections.

7. The connector according to claim 5 wherein the first and second set of protrusions are arranged to permit relative axial movement between the collet and said one of the male and female components in a first orientation and to prevent relative axial movement between the collet and said one of the male and female components in a second orientation.

8. The connector according to claim 1 further comprising at least one annular seal between the male component and the female component.

9. The connector according to claim 8 comprising at least two annular seals and further comprising a path from an exterior of the connector to a region between said seals for testing effectiveness of the seals.

10. The connector according to claim 1 wherein the collet is configured to be rotatable in at least one of a clockwise and an anticlockwise direction in order to engage the complementary inter-engaging portions.

11. The connector according to claim 1 wherein a stop is provided to indicate to an operator that the collet has been rotated sufficiently to at least one of engage and disengage the complementary inter-engaging portions.

12. The connector according to claim 1 wherein at least one of the collet and said one of the male and female components includes at least one visual indicator arranged to aid an operator with orientation of the collet so as to permit at least one of insertion and retraction of the male component with respect to the female component.

13. The connector according to claim 1 wherein the latch is mounted on the collet and is operable to engage the female component to rotationally lock the collet relative to the female component.

14. The connector according to claim 1 wherein the collet is carried by the male component and comprises a substantially tubular portion carrying the respective part of the complementary inter-engaging portions on a distal external surface thereof and a flange extending radially outwardly from a proximal end thereof.

15. The connector according to claim 14 wherein the latch is mounted on the flange and is operable to engage the female component to rotationally lock the collet relative to the female component.

16. The connector according to claim 14 comprising at least one axially extending handle mounted on the flange to facilitate rotation of the collet.

17. The connector according to claim 1 wherein the collet is formed from a less dense material than that from which the male and female components are formed.

18. The connector according to claim 1 wherein the collet is provided with at least one handle to facilitate the rotation thereof.

19. The connector according to claim 18 wherein the latch is housed in at least one of the handles.

20. The connector according to claim 1 wherein the latch is arranged to tend to extend to a locking configuration under the influence of gravity.

21. The connector according to claim 1 wherein the latch comprises a spring-biased locking mechanism configured such that the latch assumes a locking configuration to lock the male and female components together when the complementary inter-engaging portions are engaged.

22. The connector according to claim 1 further comprising a retaining mechanism configured to lock off the latch so that it remains in a set position.

23. The connector according to claim 1 wherein the latch is arranged to provide an externally visible indication when the connector is in said locked position.

24. A method of operating the connector according to claim 1 comprising the steps of:
  inserting the male component into the female component; and
  rotating the collet with respect to at least one of the male and female component to engage the complementary inter-engaging portions, whereby the latch automatically engages to lock the male and female components together when the complementary inter-engaging portions engage.

25. The method according to claim 24 employed in a process for one of inserting an item into and removing an item from a lubricator.

26. A lubricator comprising:
  an upper section;
  a lower section; and
  a connector therebetween, the connector comprising: a male component; a female component configured to receive at least a portion of said male component; a rotatable collet mounted on one of the male and female component, the collet and the other of the male and female components comprising respective complementary inter-engaging lugs configured to secure the male and female components together in an engaged position; and a latch operable to lock the male and female components together in a locked position, wherein the latch is arranged to automatically lock the male and female components together when the collet is engaged.

27. An assembly of surface well-pressure control equipment comprising:
  at least one upper piece of equipment;
  at least one lower piece of equipment; and
  at least one connector therebetween, the connector comprising: a male component; a female component configured to receive at least a portion of said male component; a rotatable collet mounted on one of the male and female components, the collet and the other of the male and female components comprising respective complementary inter-engaging lugs configured to secure the male and female components together in an engaged position; and a latch operable to lock the male and female components together in a locked position, wherein the latch is arranged to automatically lock the male and female components together when the collet is engaged.

* * * * *